Aug. 10, 1937.    C. S. ROYS ET AL    2,089,430
OSCILLOGRAPH SYSTEM
Filed Oct. 3, 1935    2 Sheets-Sheet 2
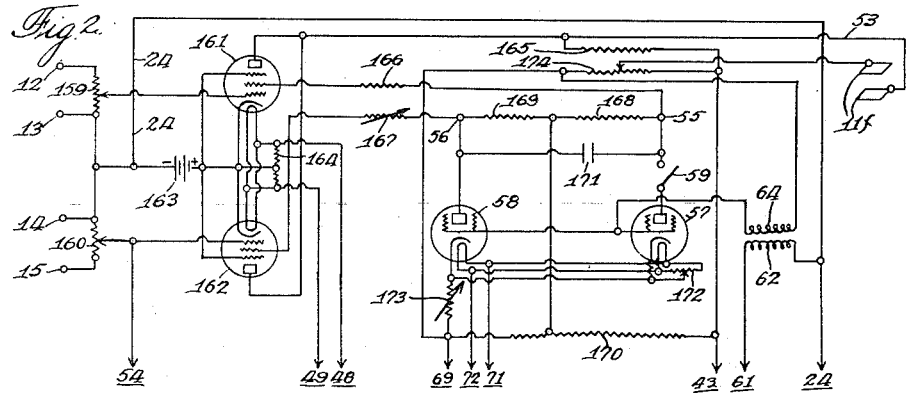
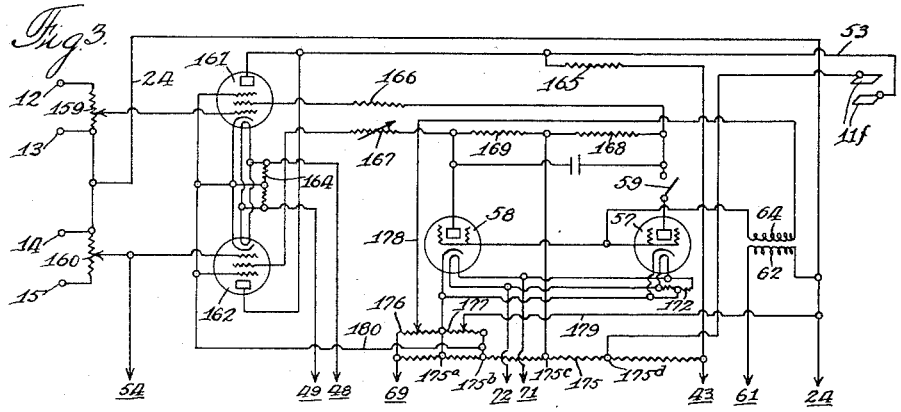
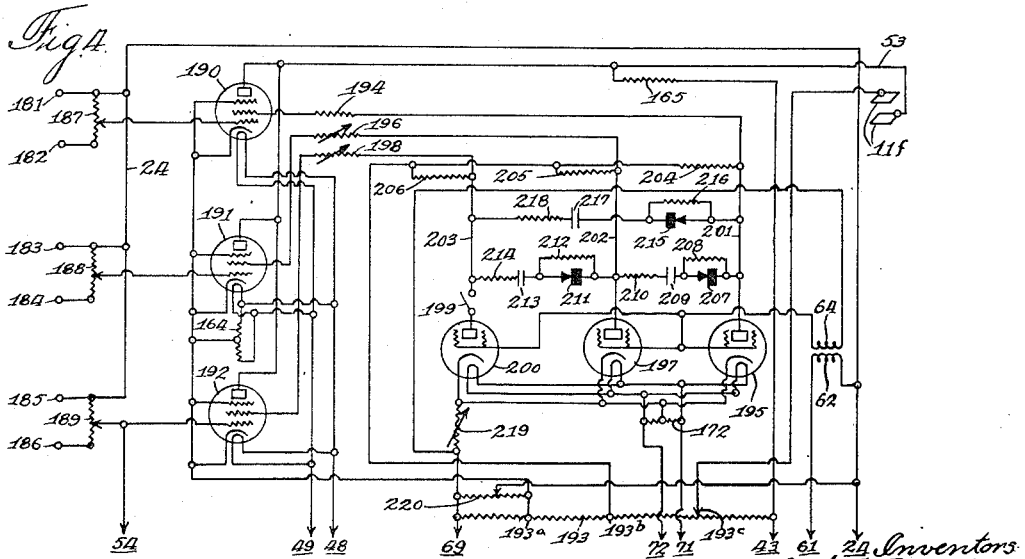

Patented Aug. 10, 1937

2,089,430

UNITED STATES PATENT OFFICE 2,089,430

OSCILLOGRAPH SYSTEM

Carl S. Roys, West Lafayette, Ind., and Harry F. Mayer, Schenectady, N. Y., assignors, by mesne assignments, to Radio Corporation of America, New York, N. Y., a corporation of Delaware Application October 3, 1935, Serial No. 43,460

30 Claims. (Cl. 171—95)

This invention relates to oscillograph systems and has particular relation to novel systems of operation of cathode ray oscillographs.

As is now well known in the art, the cathode ray oscillograph is ideally suited for the observation of electrical phenomena, particularly because the amount of signal power consumed thereby is negligible, the frequency characteristic is perfectly flat from zero to frequencies far into the radio frequency range, the electron beam may ordinarily be considered as inertialess, and there are no moving parts to wear or to get out of adjustment. Modern cathode ray tubes may reasonably be expected to have a life of several thousand hours of operation, and the auxiliary apparatus required is likewise of long life and dependable nature.

Heretofore, however, the cathode ray oscillograph has not been considered well suited for the simultaneous observation of two or more electrical phenomena, such, for example, as the voltage impressed upon a circuit and the current flowing therethrough, whereas other types of oscillographs, such as galvanometer and vibrating mirror types, may be readily built to accommodate the observation of a plurality of characteristics of a circuit, or of different circuits, at the same time.

The object of the present invention is to provide a system for controlling the operation of a cathode ray oscillograph whereby the same may be used for the simultaneous observation of a plurality of phenomena in their true mutual relationships.

The invention will be better understood and further objects and advantages thereof will become apparent from a consideration of the detailed description appearing hereinafter, taken in conjunction with the accompanying drawings forming a part hereof, in which:

Fig. 2 is a diagrammatic representation of a modification of one portion of the system illustrated in Fig. 1;

Fig. 3 is a diagrammatic representation of a further modification of the same portion of the system; and Fig. 4 is a diagrammatic representation of another modification of the same portion of the system, whereby the observation of additional phenomena may be accomplished.

Figure 1:
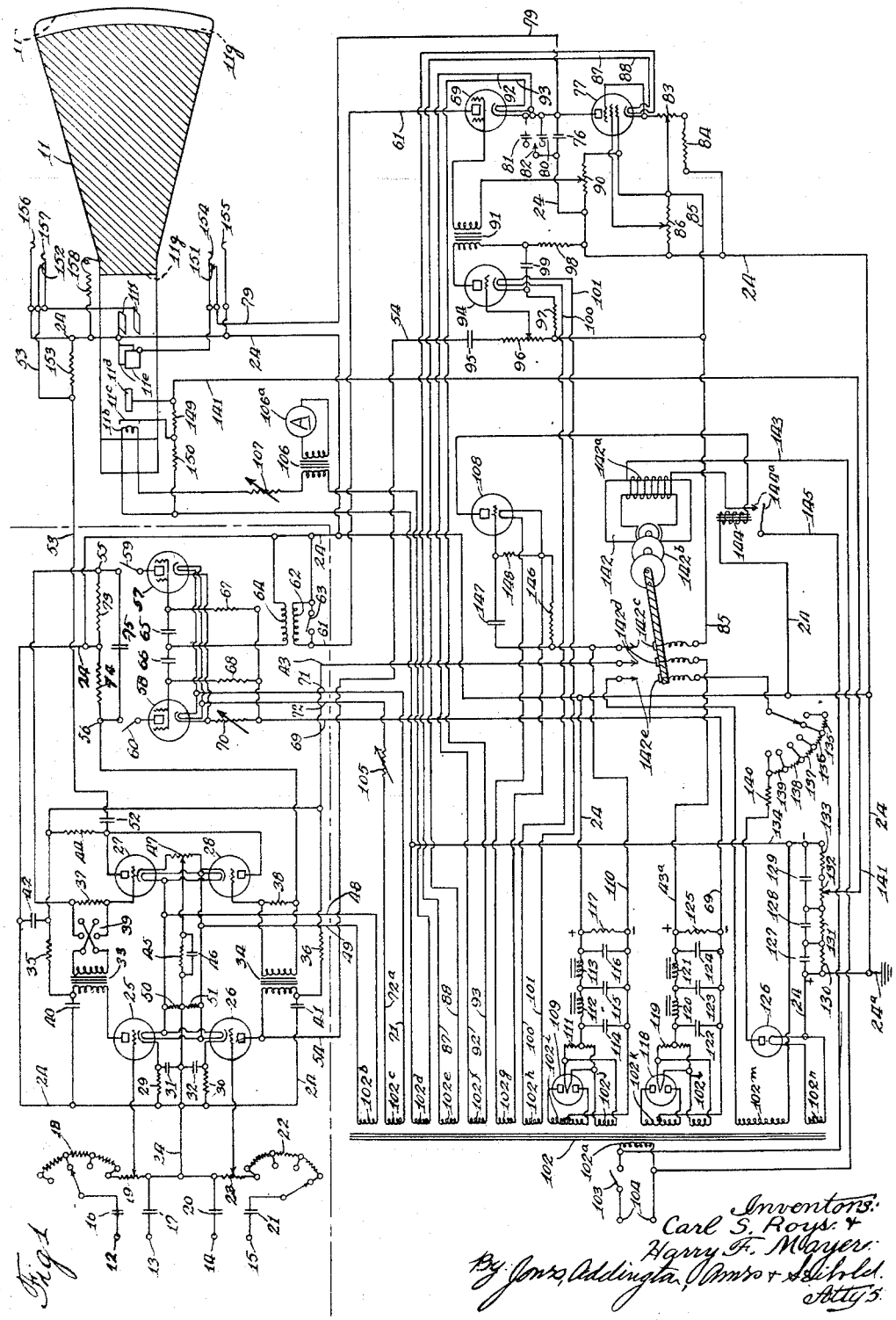
Figure 1 is a diagrammatic representation of a cathode ray oscillograph system constituting one embodiment of the invention.

Referring first to Fig. 1 of the drawings, the system therein disclosed comprises a cathode ray tube designated generally by the reference character 11 and embodying an evacuated or gas-filled envelope ordinarily made from a glass flask, the enlarged end of which is internally coated, as indicated at 11a, with a screen material which becomes fluorescent at a point where a high velocity beam of electrons strikes it. The source of the electron beam is a heated filament 11b near the opposite end of the flask. The electrons are given a high velocity by impressing a high direct current potential between one or more auxiliary electrodes, such as the electrode indicated at 11c, and the cathode 11b. The electrons are then focused into a beam by an auxiliary electrode or electrodes such as that indicated at 11d.

The focused beam is then directed between two pairs of deflecting plates 11e and 11f, which are set at right angles to each other. The deflecting plates of each pair are subjected to differences of potential and the electron beam is thereby deflected from the straight course which it would otherwise follow. Application of a potential between the two plates of one pair will deflect the beam toward the more positive plate. The potential applied between the two plates of the pair 11e, commonly called the X plates, produces a horizontal deflection of the beam, and such potential may be varied to produce a linear time axis on the screen 11a. The potential between the plates of the pair 11f, commonly called the Y plates, is varied in accordance with the quantity or phenomenon to be observed and produces a vertical deflection of the beam so that the variations of the quantity in question may be observed with relation to the predetermined time axis provided by the horizontal deflection of the beam under the influence of the X plates 11e.

The oscillograph tube 11 further preferably comprises a conducting coating 11g over most of the interior surface of the tube between the deflecting plates and the screen 11a, and this conducting coating is so electrically connected with respect to the other elements of the electric circuit system, which will be described hereinafter, as to prevent the building up of a static charge of electrons on that surface, with deleterious effects upon the operation of the device.

It will be understood that the design of the tube 11 is not essential to the operation of the systems embodying the present invention, and that the specific construction described above is simply one example of a suitable tube design.

The oscillograph tube 11 is controlled by the system illustrated so that it serves for the simultaneous observation of two electrical quantities, one of which is represented by a difference of potential applied between terminals 12 and 13 and the other of which is represented by a difference of potential applied between terminals 14 and 15. It will be understood, of course, that the external connections of these terminals may be such as to provide for the observation of two characteristics of a single circuit, such, for example, as the voltage and current thereof, or that the connections may be made to different circuits for the purpose of simultaneous observation or comparison of predetermined characteristics thereof.

The internal connections between the terminals 12 and 13 consist of insulating condensers 16 and 17, a variable resistor 18, and a potentiometer 19, all of which elements are connected in series between said terminals. The connections between the terminals 14 and 15 similarly comprise insulating condensers 20 and 21, a variable resistor 22 and a potentiometer 23, all connected in series between said terminals. One end of each of the potentiometers 19 and 23 is connected to one branch of a common conductor 24, which is preferably connected to ground, as shown at 24a, and which comprises several other branches having other elements of the system connected thereto.

The variable contacts of the potentiometers 19 and 23 are respectively connected to the grids of two triode amplifiers 25 and 26, such as type 56 triodes. The triode 25 comprises the first step of a two-stage amplifier for the quantity or signal impressed upon the terminals 12 and 13 and the second stage of said amplifier comprises a similar triode 27. The triode 26 similarly comprises the first stage of an amplifier for the signals connected to the terminals 14 and 15 and the second stage of the latter amplifier comprises another similar triode 28.

The first-stage amplifiers 25 and 26 are automatically biased by resistors 29 and 30, respectively, which are by-passed by condensers 31 and 32, these elements connecting the cathodes of the tubes 25 and 26 to the common ground conductor 24. The amplifiers of the first stage are coupled to those of the second stage by means of transformers 33 and 34, the primary windings of which are connected between the plates of the tubes 25 and 26 and a suitable plate voltage source, hereinafter described, through resistors 35 and 36. The secondary windings of the transformers 33 and 34 are preferably loaded with resistors 37 and 38, respectively, and a double-pole, double-throw reversing switch 39 is connected between the secondary of the transformer 33 and the associated loading resistor 37 to provide for 180° shifting of the phase relationship between the two signal observations.

The transformers 33 and 34 may suitably consist of audio transformers connected in step-down relationship, the loading resistors 37 and 38 being utilized to give them a sufficiently flat frequency characteristic. It will be understood, however, that any suitably designed transformers may be used and that the design may be such as to eliminate the necessity of using the loading resistors. In that case the transformers may very well have a 1:1 ratio.

Resistors 35 and 36, in conjunction with by-pass condensers 40, 41, and 42, prevent any signal currents from flowing in the high-voltage supply circuit which might possibly cause regeneration or degeneration in the amplifier, and at the same time provide additional filtering for the high voltage supply, hereinafter described, the positive side of which is connected to the amplifier circuit through a supply conductor 43. The plates of the second-stage amplifiers 27 and 28 are also connected to the supply conductor 43, through a series resistor 44.

The second-stage amplifiers 27 and 28 are connected in parallel with each other except for their grids. They have a common biasing resistor 45, by-passed by a condenser 46, connected between the ground conductor 24 and the variable contact of a potentiometer 47, the outside terminals of which are respectively connected to the cathodes of the tubes 27 and 28. This potentiometer permits adjustment of the bias on the two tubes to compensate for any slight differences in their characteristics, for it is necessary that each tube draw exactly the same plate current in order for the two signals to be reproduced by the oscillograph on the same axis.

The filaments of the tubes 25, 26, 27, and 28 are all connected in parallel across a filament supply circuit comprising conductors 48 and 49, which extend to a suitable current source, hereinafter described. A mid-tap resistor comprising arms 50 and 51 is connected between the two filament supply conductors, and the mid-point tap thereof is connected to the ground conductor 24 in order to reduce interference and distortion resulting from the use of alternating current for the filament supply.

A connection extends from the plates of the amplifiers 27 and 28 through a blocking condenser 52 and a conductor 53 to one of the Y plates 11f of the cathode ray tube, the other of said Y plates being connected to the ground conductor 24, all as described in detail hereinafter.

A connection extends from the plate of the first-stage amplifier 26 through a conductor 54 to another portion of the system which will also be described hereinafter.

The grids of the second-stage amplifiers 27 and 28 are not connected to ground, as they ordinarily would be, but, instead, are connected (through the secondary windings of transformers 33 and 34 and also through resistors 37 and 38, respectively associated therewith) to points 55 and 56 in a portion of the system which will be referred to as the commutating circuit. The action of the commutating circuit is such that points 55 and 56 are alternately at ground potential and at a potential which is negative with respect to ground, preferably to the extent of about 60 volts; that is to say, when the point 55 is at ground potential the point 56 is at a potential of about 60 volts negative with respect to ground, and vice versa. The result of this arrangement is that when the point 55 is at ground potential the amplifier 27, which has its grid connected to said point 55 through the secondary winding of transformer 33, will have the normal bias provided by the connection through the resistor 45 and will amplify its signal and communicate it to the Y plates of the oscillograph 11 through the conductor 53. At the same time, the amplifier 28, having its grid connected to the point 56 through the secondary winding of transformer 34, will have an extra negative bias of, say, 60 volts, which is sufficient to cut off the plate current in the tube so that no signal can pass therethrough. When the commutating circuit operates to reverse the potential relationship of the points 55 and 56, the situation is reversed, so that the first signal is blocked and the second one passed.

The commutating circuit comprises two grid-controlled rectifiers 57 and 58, such as type 885 gas triodes, which are connected in a circular similar to the common single phase, two-tube inverter circuit. A manually-operable switch 59 is connected between the point 55 and the plate of the triode 57, and a switch 60 is similarly connected between the point 56 and the plate of the triode 58, these switches being normally closed. The operation of the triodes is controlled by another portion of the system known as the sweep circuit, hereinafter described, which is connected to the commutating circuit through a conductor 61. This conductor is connected to one terminal of the primary winding 62 of an air-core transformer, the other terminal of which is connected to the ground conductor 24. This transformer primary winding has a manually-operable switch 63 connected in shunt relationship thereto. This switch is normally open, but may be closed upon occasion to short-circuit the transformer primary winding and thereby to render the commutating circuit inoperative if it is desired to use the oscillograph for the observation of a single wave. The secondary winding 64 of the air-core transformer has one of its terminals connected to the ground conductor 24 and the other terminal thereof connected through condensers 65 and 66, respectively, to the grids of the triodes 57 and 58.

The grids of the triodes 57 and 58 are connected through resistors 67 and 68, respectively, to a conductor 69, which extends to the negative side of a source of direct current potential hereinafter referred to. The said source is the same as the one having its positive side connected to the conductor 43. The negative side of said source is also connected through the conductor 69 and a variable resistor 70 to the cathodes of both triodes 57 and 58. The filaments of said triodes are connected in parallel across a suitable source of filament current, hereinafter described, by means of conductors 71 and 72. The points 55 and 56 in the plate circuits of the triodes 57 and 58 are connected to ground through resistors 73 and 74, respectively, and are also connected together by a condenser 75 which shunts said resistors.

The sweep circuit above mentioned serves to control the horizontal movement of the electron beam in the oscillograph tube 11 to provide a time axis for the observations to be made. This operation is accomplished by applying to the X plates 11e of the cathode ray tube a difference of potential which varies according to a predetermined cycle. At the start of the cycle, the difference of potential is such as to cause the electron beam to impinge upon the screen 11a at the zero point, and such difference of potential may be zero. The potential difference is then built up at a constant rate to a definite value which effects the maximum desired horizontal deflection of the beam away from the zero or starting point, and is then rapidly reduced to its initial value so that the beam returns with corresponding rapidity to the zero or starting point thereof.

The difference of potential which increases at a constant rate as above described is secured by means of a condenser 76 in the sweep circuit and a pentode 77 connected in series with said condenser across a direct current source of relatively high and constant voltage. The pentode 77, which may suitably consist of a type 57 tube, has an extremely high A. C. plate resistance so that changes in plate voltage have almost no effect upon the plate current. The pentode therefore serves as a constant current device in the charging circuit of the condenser 76 and thus causes said condenser to be charged at essentially a constant rate.

The X plates 11e of the oscillograph are connected directly across the condenser 76 by means of a connection from one terminal of said condenser to the ground conductor 24, to which one of the plates 11e is also connected, and by means of a conductor 79 extending from the other terminal of said condenser to the other one of the plates 11e. Additional condensers 80 and 81 are selectively connectible in parallel with the condenser 76 by means of a switch 82 so that different charging rates may be provided. An increase in the capacity of the condenser bank will cause the voltage thereacross to build up at a lower rate and will accordingly decrease the rate at which the electron beam is moved across the screen of the oscillograph, and vice versa.

As shown, the connections of the pentode 77 include a connection from the plate thereof to those terminals of the condensers 76, 80, and 81 which are connected to the conductor 79. The cathode of the pentode is connected to one terminal of a potentiometer 83, the other terminal of which is connected through a series resistor 84 to the ground conductor 24 and the adjustable contact of which is connected to a conductor 85. The function of the resistor 84 is to compensate for the change in current consumption of the sweep circuit when the setting of the potentiometer 83 is changed, thus improving the voltage regulation.

As will appear hereinafter, the ground conductor 24 is connected to the positive side of a source of relatively high direct current potential, while the conductor 85 is connected to the negative side of said source. The control grid of the pentode is connected directly to the conductor 85 so that its bias is controllable by means of the potentiometer 83 and the screen of the pentode is connected to the adjustable contact of a potentiometer 86, whereby its voltage may be controlled, said potentiometer having its terminals connected to the conductors 24 and 85, respectively. The filament of the pentode 77 is connected to a suitable source of filament current, hereinafter described, by means of conductors 87 and 88.

The condenser 76 (and associated condenser 81 or 82, if used) must be discharged automatically when the difference of potential across the same reaches a predetermined value which produces the maximum desired horizontal deflection of the electron beam in the oscillograph tube. Such discharge is effected through a grid-controlled rectifier or triode 89, the plate of which is connected through the conductor 61 and the primary winding of the transformer 62 to the ground conductor 24. The grid of the triode 89 is at a fixed but adjustable potential which is negative with respect to ground, as determined by the setting of a potentiometer 90, the terminals of which are respectively connected through the conductors 24 and 85 to the same relatively high voltage direct current source which is connected to the pentode 77 and the condensers 76, 80, and 81. The adjustable contact of the potentiometer 90 is connected through the secondary winding of a transformer 91 to the grid of the triode 89. The cathode and one side of the filament of this triode are connected to the ungrounded sides of the condensers 76, 80, and 81, that is, to the conductor 79. The filament is connected by means of conductors 92 and 93 to a suitable source of filament current hereinafter described.

At the instant when the condenser 76 (reference to which hereinafter will be understood to include also the condensers 80 and 81 if one of the latter is being used) begins to charge, or immediately after a discharge thereof, the cathode of triode 89 is substantially at ground potential. When de-ionization is complete the tube is non-conducting and the condenser 76 begins to charge. As the condenser 76 charges the potential of the cathode of tube 89 becomes increasingly negative with respect to ground, eventually reaching a value in the neighborhood of the grid potential. This tube is of a type which ionizes when its grid is at a predetermined negative potential with respect to its cathode for some predetermined positive anode potential, and thereupon suddenly becomes conducting, and the condenser 76 is then rapidly discharged therethrough. This device, therefore, serves to reduce the difference of potential between the X plates 11e of the oscillograph rapidly to zero by discharging the condenser 76 when such potential reaches its predetermined maximum value.

It is necessary that the sweep frequency be either the same as or a sub-multiple of the frequency of the waves to be observed; otherwise the electron beam in the oscillograph will not retrace the same path each time it crosses the screen. This condition may be approximately realized by manipulation of the potentiometer 83, but it is desirable to interlock the sweep circuit with the signal circuit to prevent the wave from varying in position. This is accomplished by means of a triode amplifier 94, such as a type 56 triode, which is controlled from the signal circuit through the previously-mentioned conductor 54 and an insulating condenser 95, one of the terminals of which is connected to said conductor and the other terminal of which is connected to one end of a potentiometer 96. The other terminal of said potentiometer is connected to the conductor 85 and the adjustable contact of the potentiometer is connected to the grid of the triode 94.

The cathode of the triode 94 is connected through a resistor 97 to the conductor 85. The plate of the triode 94 is connected through the primary winding of the transformer 91 and a resistor 98 in series therewith to the ground conductor 24 and a condenser 99 is connected between the junction point of said transformer winding and resistor and the cathode of the triode. The filament of the triode is connected through conductors 100 and 101 to a suitable source of filament current described hereinafter.

By means of this arrangement, a portion of the current from one of the signal circuits is utilized to control the triode 94, the plate current of which is introduced through the transformer 91 into the grid circuit of the triode 89. The amount of current thus introduced into the grid circuit of the triode 89 is controllable by the potentiometer 96 in the grid circuit of the triode 94. This introduction of current into the grid circuit of the tube 89 under the control of one of the signal circuits insures that said tube always breaks down at the same point on the cycle of the controlling signal. The other signal will be of the same frequency or a multiple or sub-multiple thereof and therefore the breakdown of the tube 89 will always occur at the same point on the cycle of this signal as well as on the cycle of the first signal.

In addition to amplifying the signal current to be introduced into the grid circuit of the triode 89, the triode 94 also prevents the transient voltages accompanying the breakdown of the triode 89 from getting into the signal source, which they would do if a bi-directional coupling element such as a transformer were used to introduce the signal current into the grid circuit of tube 89.

A power transformer 102 is utilized to supply the filament currents and the high voltages required for the operation of the various devices of the system, as hereinbefore referred to. This transformer comprises a primary winding 102a, which is connected through a main switch 103 and terminals 104 to any suitable alternating current source. The transformer 102 comprises a number of secondary windings 102b to 102n, inclusive, the connections of which will now be described.

The secondary winding 102b is connected to conductors 48 and 49 to supply the filament current for the amplifiers 25, 26, 27, and 28. The secondary winding 102c is connected to conductors 71 and 72a, the latter being connected through a variable resistor 105 to the conductor 72 to furnish the filament current for the triodes 57 and 58. The secondary winding 102d is connected through the primary winding of a transformer 106 and thence through a variable resistor 107 to the filament 11b of the cathode ray oscillograph tube 11. The variable resistor 107 is utilized to adjust the filament current of the cathode ray tube and the transformer 106 serves merely to insulate an ammeter 106a, which is connected in the secondary circuit of the transformer to indicate the filament current value, from the high voltage circuits.

The secondary winding 102e is connected to conductors 87 and 88 to supply the filament current for the pentode 77, and the winding 102f is connected to conductors 92 and 93 to supply the filament current for the triode 89. The secondary winding 102g is connected to the filament of a triode 108 which is described hereinafter, and the winding 102h is connected to conductors 100 and 101, which are the filament-supply conductors for the triode amplifier 94.

The remainder of the secondary windings of the transformer 102 are utilized for the operation of rectifiers constituting relatively high-voltage, direct-current sources required in connection with the system. The winding 102i has its terminals connected to the plates of a double-wave rectifier 109, which may suitably consist of a type 280 rectifier tube, and which derives its filament current from the transformer secondary winding 102j. The direct-current leads of this rectifier comprise one branch of the conductor 24, which is the positive side of the direct current source, and a conductor 110, which is the negative side. The conductor 110 extends to a center tap on the transformer winding 102i and the positive side of the circuit is connected to the center tap of the usual filament bridging resistor 111 associated with the rectifier 109. A filter system comprising inductances 112 and 113, condensers 114, 115, and 116, and a resistor 117 is included in the direct-current circuit.

The secondary windings 102k and 102l of the transformer 102 are utilized in connection with a full-wave rectifier 118 in the same manner described above with reference to the transformer windings 102i and 102j, in connection with the rectifier 109. The rectifier 118 may likewise suitably consist of a type 280 rectifier tube and the rectifier and filter system similarly includes a center tap filament bridging resistor 119, inductances 120 and 121, condensers 122, 123, and 124, and a resistor 125. This arrangement impresses a direct current potential upon conductors 43a and 69, the former being the positive side of the circuit and being connectible to the conductor 43 through a switch which is described hereinafter.

The transformer secondary windings 102m and 102n are utilized in conjunction with a rectifier 126 which may suitably consist of a type 866 half-wave rectifier tube. This rectifier serves as a high-voltage, direct-current supply for the cathode ray tube 11, and the requirements with respect to this source are such that no inductance is necessary in the filter, there being merely a condenser bank comprising condensers 127, 128, and 129 and a voltage divider comprising resistors 130, 131, 132, and 133, connected across the output terminals of the rectifier. The transformer winding 102n constitutes the source of filament-current supply for the rectifier 126, and one side of the filament circuit is connected to a branch of the ground conductor 24 and constitutes the positive side of the high-voltage, direct-current supply circuit. The negative side of said circuit is derived from one terminal of the high-voltage transformer winding 102m and is connected through a conductor 134 to one side of the filament 11b of the cathode ray tube 11. The other terminal of the transformer secondary winding 102m is connected through a switch, hereinafter described, and resistors 135, 136, 137, 138, 139, and 140 to the plate of the rectifier tube 126. The resistors 135 to 139, inclusive, constitute the steps of a variable resistor which controls the output voltage of the rectifier and also stabilizes the operation thereof. A rectifier of this character has a tendency to conduct only at intervals when very lightly loaded, when no series resistance is used.

The resistors 130, 131, 132, and 133 insure an equally-distributed load on the condensers 127, 128, and 129. The resistor 132 is also utilized as a potentiometer for supplying a variable intermediate voltage for the first anode 11d of the cathode ray tube 11, said resistor 132 having a variable tap connected through a conductor 141 to said anode.

In addition to the elements described above, the system preferably comprises a time-delay circuit for delaying the application of the high voltages to the cathode ray tube and to the various heater type tubes of the system until the cathodes thereof are well heated. This portion of the system preferably comprises a switch-operating motor 142, the winding of which is indicated at 142a. One terminal of this winding is directly connected through a conductor 143 to one of the alternating current supply terminals 104, and the other terminal of said winding is connected through contacts 144a of a control relay 144 and a conductor 145 to the other side of the alternating current supply circuit, at a point inside the main switch 103, so that this circuit is deenergized when said main switch is opened.

The actuating coil of the control relay 144 has one of its terminals connected to the ground conductor 24 and its other terminal connected to the plate of the triode 108. This triode serves to furnish the desired time delay, because the plate current therein builds up very slowly due to the circuit arrangement utilized. When the main switch of the system is closed the direct-current voltages furnished by the rectifiers are established substantially immediately and the output voltage of the rectifier 109 is applied to the plate of the triode 108, the positive side of this circuit extending through the ground conductor 24 and the winding of the control relay 144 to the plate of the triode 108, and the negative side of the circuit extending through the conductor 110 and a resistor 146 to the filament of the triode. When the plate current starts to flow there is a voltage drop across the resistor 146, which causes a negative bias to be applied to the grid of the triode 108 through a condenser 147. If there were no way for the biasing voltage to leak off of the grid the plate current would reach a steady state immediately, at some low value determined by the total plate voltage and the bias, but with the connections shown the condenser 147 will gradually charge through a resistor 148 and as it does so the negative bias decreases, allowing the plate current to increase. An increase in the plate current will cause an increase in the drop across the resistor 146 and the loss of bias will be partly counteracted thereby. Thus, the rise of plate current is very gradual. Eventually the grid will be at filament potential (zero bias) and the plate current will then be at its maximum value.

The control relay 144 will not operate to close its contacts 144a until the current flowing in its actuating winding 144, which is the plate current of the triode 108, reaches a predetermined value. The circuit is so designed that the plate current of the triode 108 will not reach this predetermined value until the desired time delay after the closing of the main switch 103 has elapsed and, therefore, the closing of the contacts 144a is delayed for said desired period.

Upon the closing of the contacts of the control relay 144 the winding of the switch-operating motor 142 is connected directly across the alternating current-supply circuit terminals 144 and said motor operates through suitable gearing indicated at 142b to close a plurality of pairs of contacts 142c, 142d, and 142e. The contacts 142c are connected in the direct-current output circuit of the rectifier 109, between the negative output conductor 110 and the conductor 85, which extends to the various elements of the system to be connected to this direct-current source. The contacts 142d are connected in the positive side of the direct-current output circuit of the rectifier 118 between the conductors 43 and 43a, and the contacts 142e constitute the previously-mentioned switch in the plate circuit of the half-wave rectifier 126.

When the switch contacts 142c, 142d, and 142e are closed, all of the direct-current supply circuits are completed and the system is ready for operation. Under this condition the switch-operating motor 142 is blocked from further operation but this motor is of such a design that it can remain in this condition indefinitely. The switch contacts, therefore, remain closed as long as the main switch 103 is closed. Upon opening of the switch 103 the motor winding 142e is deenergized and the switch contacts are opened through the action of gravity and the elasticity of the contacts.

The conductor 141 hereinbefore referred to as supplying a variable intermediate voltage for the first anode 11d of the cathode ray tube 11, in addition to being connected directly to said anode 11d, is connected through voltage dividing resistors 149 and 150 to one side of the filament or cathode 11b of the tube 11. The junction point of the resistors 149 and 150 is connected to the auxiliary electrode 11c, so that the desired intermediate voltage is applied thereto.

One of the plates of each pair of deflecting plates 11e and 11f of the cathode ray tube is connected directly to the ground conductor 24. The other plate of the pair 11e is connected through a pair of normally closed jack contacts 151 to the output conductor 79 of the sweep circuit, as hereinbefore indicated. The second or ungrounded plate of the pair of deflecting plates 11f is connected through normally closed jack contacts 152 to the output conductor 53 of the signal amplifying and commutating circuit system. A bridging resistor 153 is connected between the conductor 53 and the ground conductor 24 and therefore is connected directly across the deflecting plates 11f when the jack contacts 152 are closed for the normal operation of the system.

The jack contacts 151 and 152 are provided in order to accommodate the use of the cathode ray tube 11 in connection with external circuits, if desired. In that event the deflecting plates 11e and 11f of the cathode ray tube are disconnected from the system herein illustrated, by reason of the opening of the jack contacts 151 and 152 incident to the insertion of plugs in the respective jacks. A suitable double contact plug is utilized in each case, one of the terminals of one plug making contact with a contact member 154 and the other contact of the same plug making contact with an associated contact member 155, whereby the leads of said plug are connected directly to the respective deflecting plates of the pair 11e. A similar plug may be utilized to make external connections in a similar manner through jack contacts 156 and 157 to the respective plates of the pair 11f.

The metallic coating 11g on the inside of the flaring portion of the tube 11 is connected through a resistor 158 to the ground conductor 24 and a return path for the electrons is thereby provided. This provision eliminates instability of operation of the tube and improves the sharpness of the beam by reason of the negative potential which is impressed upon the conducting coating 11g.

In the operation of the above-described system for the observation of two waves, the signal voltages are respectively applied to the two sets of terminals 12, 13 and 14, 15 and the variable resistors 18 and 22 and potentiometers 19 and 23 should be initially adjusted so that the signal input to the system is reduced to as low a value as possible. In other words, the variable resistors 18 and 22 will be adjusted to interpose the maximum series resistance in the corresponding signal circuits and the potentiometers 19 and 23 will be adjusted so that the minimum resistance is connected between the movable contacts thereof and the common connection therebetween, which constitutes a branch of the ground conductor 24.

The main power switch 103 of the system is then closed, and after a predetermined time delay has elapsed the motor-operated switch contacts 142c, 142d, and 142e will be automatically closed in the manner hereinbefore described. Ordinarily at this point a broad stripe of light will appear across the screen of the oscillograph tube 11. This indicates that the commutator circuit has not begun to operate and the operation of this portion of the system is started by opening one of the switches 59 and 60 momentarily. These switches may be conveniently associated with a single dial which may be turned in either direction to open either one of the two switches.

Upon reclosing of the switch which has been opened, the commutator circuit will begin to operate normally, and ordinarily two axes will appear on the oscillograph screen. These two axes are brought together by adjustment of the potentiometer 47. Thereupon the potentiometer 23 may be turned slowly away from its minimum position until a signal of desirable amplitude appears. If the signal is so weak that it does not give sufficient amplitude, the variable resistor 22 may be adjusted to obtain a further increase. The potentiometer 83 is then to be adjusted until the desired number of cycles appears on the screen, and at the same time the travel of the wave is reduced to a minimum. The last trace of travel should then be eliminated by adjusting the potentiometer 96 to increase the amount of signal current introduced into the sweep circuit, but only to the extent necessary to make the wave stationary on the screen. The introduction of an excessive amount of signal current into the sweep circuit will shorten the sweep. The potentiometer 19, and also the variable resistor 18 if necessary, may now be adjusted to bring the other signal up to any desired amplitude.

In order to make certain that the two signals appear in their true phase relation (avoiding any possible stabilization of the waves in false relative positions), it is advisable to vary the potentiometer 83 and to note the phase relationship for various speeds of sweep with the commutating circuit not operating, and when the potentiometer 83 is finally set as desired, to select a setting which gives what appears to be the true phase relationship, under most desirable conditions of speed of sweep and stabilization. This should be done carefully, bringing the sweep frequency as near as possible to the exact desired value before locking in with the synchronizing signal control. Starting the commutating circuit in operation should then have no effect upon the signal already being shown. The phase of one signal may be reversed by means of the reversing switch 39.

The controls 70, 82, 86, 90, 105, 107, 132, and 135—139 ordinarily require no operating adjustments. The variable resistor 70 controls the bias on the grid-controlled rectifiers 57 and 58. The tap switch 82, which may be used to vary the capacity of the condenser bank in the sweep circuit, is preferably adjusted to give the maximum capacity at which the slowest sweep is obtained with a given setting of the potentiometer 83, and thereafter seldom requires any further adjustment. The potentiometer 86 controls the screen voltage of the pentode 77, which seldom requires adjustment. The potentiometer 90 varies the length of the sweep and does not require adjustment during ordinary operations. The variable resistor 105 may be utilized to vary the filament current of the grid-controlled rectifiers 57 and 58, but usually such adjustment is not necessary. The variable resistor 107 serves to control the amount of current supplied to the filament 11b of the cathode ray tube 11, which likewise generally requires no adjustment. The filament current should be adjusted to a value between 2.5 and 3 amperes and may be read by means of the ammeter 106a. The potentiometer 132 and the variable resistance 135—139 respectively control the voltage applied to the first anode 11d and to the cathode 11b of the cathode ray tube 11, and these values likewise seldom require change after a satisfactory operating condition has been obtained.

With the system described above, signals of different frequencies may be observed if one is a harmonic of the other. In that event the circuit carrying the signal of the lower frequency should be connected to the terminals 14 and 15, since the synchronizing signal is supplied to the sweep circuit from the amplifier connected to said terminals.

From the foregoing physical description of the system it will be seen that each of the signals to be observed passes through two amplifier stages before reaching the deflecting plates of the cathode ray tube. These amplifiers, 25, 26, 27, and 28, alternately block and operate normally so that first one signal is transmitted and then the other. The commutating circuit, comprising the grid-controlled rectifiers 57 and 58, controls the bias on the said amplifiers, thus effecting the desired commutation. The rectifiers 57 and 58 are, in turn, controlled by the sweep circuit, the arrangement being such that commutation takes place at the end of each sweep.

The primary function of the sweep circuit is to cause the electron beam to move horizontally at constant speed across the screen of the cathode ray tube and then to return suddenly to the starting point, this cycle being repeated continuously. This operation is accomplished by the design and adjustment of the sweep circuit, which causes a voltage wave of "saw tooth" form to be impressed upon the X plates 11e of the cathode ray tube, in the manner hereinbefore described.

The operation of the commutating and amplifying circuits under the control of the sweep circuit may be described by assuming that at the start the rectifier 58 is conducting and that the rectifier 57 is not conducting. When the condenser 76 in the sweep circuit discharges, the surge is transmitted through the air-core transformer 62, 64 and impressed upon the grids of the rectifiers 57 and 58 through the condensers 65 and 66. The polarity of the air-core transformer is such that the surge sent to the grids is positive, and if tne biasing resistor 70 is adjusted correctly, the rectifier 57 will become conducting.

The total voltage across the commutating circuit may suitably be about 75 volts, and the voltage across a conducting grid-controlled rectifier of the type herein referred to is about 15 volts. Therefore, the plate of the rectifier 57, which was at ground potential when the tube was not conducting, must fall to approximately 60 volts below ground potential when the tube breaks down. The plate of the rectifier 58 was already 60 volts below ground, so that at the instant after the rectifier 57 has started, the plate of the rectifier 58 must be approximately 120 volts below ground, since condensers act as short circuits for an infinitesimal amount of time after a voltage is applied thereto. The condenser 75 immediately starts charging to its new state of equilibrium through the resistors 73 and 74, and the charging time, although small, is appreciable, so that before the plate of the rectifier 58 has come up to a positive potential with respect to the cathode thereof, the gas in the tube has de-ionized, rendering the tube non-conducting.

Now the circuit is in a steady state, and the next surge from the sweep circuit will cause the current to shift back to the rectifier 58 in the same manner. It is evident, therefore, that the points 55 and 56, to which the grids of the second-stage amplifiers 27 and 28 are respectively connected, are alternately at ground potential and at a potential approximately 60 volts below ground.

When the point 55 is at ground potential the amplifier 27 will have the normal bias provided by the resistor 45 and will amplify its signal and communicate the same to the Y plates 11f of the cathode ray tube 11. At the same time the amplifier 28 will have an extra negative bias of approximately 60 volts by reason of the connection of the grid of said amplifier to the point 55 in the commutating circuit, which at that time is at a potential of approximately 60 volts below ground potential. This extra negative bias on the grid of the amplifier 28 is sufficient to cut off the plate current in said amplifier, so that no signal current can get through the same. When the commutating circuit operates, the situation is reversed and the first signal is blocked and the second one passed.

It will be seen, therefore, that the signals which are respectively impressed upon the terminals 12, 13 and 14, 15 are alternately impressed, after being suitably amplified, upon the Y plates of the cathode ray tube, and that the commutation between the two signal circuits takes place at the end of each sweep of the electron beam across the viewing screen, the horizontal sweep of the beam across the screen being effected at constant speed and at regular intervals synchronized with the frequency of the signals, by reason of the operation of the sweep circuit.

The operation of the cathode ray tube, therefore, is so controlled by the system disclosed that the electron beam traces the wave form of one of the two signals on each alternate sweep across the viewing screen, and traces the wave form of the second signal on each other alternate sweep. These sweeps are made so rapidly that the persistence of vision makes it appear that the two waves are being traced simultaneously and continuously upon the viewing screen, and this effect may be enhanced by the use of screen materials which, in themselves, possess some degree of persistence of fluorescence. In any event, the visual effect of the operation of the system is that of absolutely simultaneous and continuous observation of two waves in their true phase relationship. This effect will be recognized as a highly novel and extremely desirable accomplishment in the utilization of cathode ray oscillographs controlled by purely electrical systems.

The system shown in Fig. 1 is adapted for the observation of alternating current waves and alternating components of signals of various kinds. Said system may be readily modified, however, to accommodate the observation of direct current signals or composite signals of any kind. In order to accomplish this result, it is merely necessary to modify the amplifying and commutating circuits of the system, and Figs. 2, 3 and 4 of the drawings illustrate suitable modifications of said circuits.

Each of these figures shows a modified arrangement of the amplifying and commutating circuits, which may be bodily substituted for the portion of the previously-described system enclosed by the dot-and-dash lines in the upper lefthand corner of Fig. 1. In considering these modifications, therefore, it will be understood that the complete system in each case will be the same as that shown in Fig. 1, with the exception of the said upper lefthand portion thereof and with the slight further exception that in utilizing these modifications a minor change is made in the connections of one of the deflecting plates 11f of the cathode ray tube 11, all as fully described hereinafter. The modifications shown in Figs. 2, 3 and 4, in addition to providing for the observation of alternating and composite signals, include various other features of advantage, as will presently appear.

In describing Figs. 2, 3 and 4 of the drawings, the same reference characters used in connection with Fig. 1 will be applied to the various parts of the system in so far as the same are identical with the corresponding parts of Fig. 1.

Referring to Fig. 2, the signal circuit connections are provided through terminals 12, 13, 14, and 15, and potentiometers 159 and 160 are connected across the terminals 12, 13 and 14, 15, respectively. In this system single-stage amplifiers are used in place of the two-stage amplifiers of Fig. 1. These single-stage amplifiers are constituted by pentodes 161 and 162, the control grids of which are connected to the movable contacts of the potentiometers 159 and 160, respectively.

A small battery 163, such, for example, as a 3-volt battery, may be utilized to supply the bias voltage for the pentodes 161 and 162, said battery having its negative terminal connected to the ground conductor 24 and its positive terminal connected to the cathodes of both of the tubes 161 and 162, the same point being also connected in the conventional manner to a mid-point tap on a resistor 164 which is connected across the filament-supply circuit of the tubes. This filament-supply circuit is constituted by the conductors 48 and 49, as in Fig. 1.

A connection extends from the grid of the pentode 162 to the conductor 54 and serves the purpose of synchronizing the sweep circuit with the signals being observed, as previously described in connection with Fig. 1.

The plates of the pentodes 161 and 162 are connected directly to the conductor 53, which extends to one of the Y plates 11f of the cathode ray tube 11, as before. The plate voltage for the pentodes 161 and 162 is supplied from the high-voltage, direct-current supply conductor 43 through a load resistor 165.

The screen of the pentode 161 is connected through a resistor 166 to the point 55, which is the same point in the circuit as that designated by the same reference character in Fig. 1, and the screen of pentode 162 is connected through a variable resistor 167 to the point 56 of the system. These points 55 and 56 are connected to the plates of triodes 57 and 58 in the same manner as in Fig. 1, except that here only one of these connections is provided with a control switch, namely, the switch 59 in the connection from the point 55 to the plate of the triode 57. This switch may be located in either of the two connections referred to, and will serve the same purpose as the two switches 59 and 60 in Fig. 1.

Between the points 55 and 56, two resistors 168 and 169 are connected in series, and the junction point therebetween is connected to a tap on a voltage divider 170, the terminals of which are connected to the high-voltage, direct-current supply terminals 43 and 69, respectively. The conductor 69 constitutes the negative side of this supply circuit, and the point to which the junction point of resistors 168 and 169 is connected may suitably be at a potential of about 75 volts positive with respect to said conductor 69. A condenser 171 is also connected between the points 55 and 56. This condenser corresponds to the condenser 75 of Fig. 1, and the resistors 168 and 169 correspond to the resistors 73 and 74 of Fig. 1.

The filaments of the triodes 57 and 58 are connected in parallel across the filament-supply circuit constituted by the conductors 71 and 72, and a filament-bridging resistor 172 is connected across this circuit with a mid-point tap connected to the cathodes of the tubes 57 and 58 in the usual manner. These cathodes are connected to the negative direct-current supply conductor 69 through a variable resistor 173, similar to the variable resistor 70 of Fig. 1.

The air-core transformer 62, 64 is utilized as in Fig. 1, but the secondary connections thereof are somewhat different. One side of the secondary winding is connected directly to the grids of both of the triodes 57 and 58 and the other terminal of said secondary winding is connected to the negative direct-current supply conductor 69.

The only other difference between the circuits of Fig. 2 and the corresponding portion of Fig. 1 is in the connection of the upper one of the deflecting plates 11f of the cathode ray tube 11. This upper deflecting plate, instead of being connected to the ground conductor 24, as shown in Fig. 1, is connected to a variable tap on a potentiometer 174, the terminals of which are respectively connected to the high-voltage, direct-current supply conductors 43 and 69.

The operation of the circuits of Fig. 2 is similar to that of the corresponding portion of Fig. 1, but it will be seen that the connections are such that direct-current signals and components of signals may be observed as well as alternating-current signals. The number of electron tubes utilized in the system has been reduced by the substitution of the single-stage amplifiers constituted by the pentodes 161 and 162, for the double-stage amplifiers constituted by the triodes 25, 26, 27, and 28 of Fig. 1. In connection with the pentodes 161 and 162, the resistor 166 serves to reduce the screen voltage applied to the pentode 161 and the variable resistor 167 performs the same function with respect to the pentode 162. In this way, the variable resistor 167 provides a means of balancing the plate currents of the two pentodes, whereby the axes of the two signals to be observed are made to coincide on the viewing screen of the oscillograph tube 11. The connection of the upper one of the deflecting plates 11f to the movable contact on the potentiometer 174 permits the axis of the wave under observation to be shifted vertically on the screen.

The operation of the commutating circuit, comprising the triodes 57 and 58, is the same in Fig. 2 as in Fig. 1, and these commutators serve alternately to reduce and restore the screen voltage on the pentodes 161 and 162, whereby said pentodes are caused alternately to pass and block the signals of the respective signal circuits to which they are connected, thus causing the oscillograph to give alternate traces of the two signals under observation, just as in the system shown in Fig. 1.

The modification of the amplifying and commutating circuits shown in Fig. 3 is similar in most respects to that shown in Fig. 2, as indicated by the extent to which similar reference characters are used. The differences reside in the manner of supplying direct-current potentials to various parts of the system. A voltage divider 175, as illustrated in Fig. 3, is connected between the high-voltage, direct-current supply conductors 43 and 69, and various intermediate connections are made to the same at points 175a, 175b, 175c, and 175d.

A potentiometer 176 is connected between the negative end of the voltage divider 175 (conductor 69) and the point 175a, and a potentiometer 177 is connected between the points 175a and 175b. A conductor 178 extends from the movable contact of the potentiometer 176 to one terminal of the secondary winding 64 of the air-core transformer 62, 64, and replaces the connection of said terminal, shown in Fig. 2, directly to the negative direct-current supply conductor 69. The movable contact of the potentiometer 177 is connected through a conductor 179 to the ground conductor 24.

The point 175a on the voltage divider 175 is connected directly to the cathodes of the commutating triodes 57 and 58, instead of connecting said cathodes to the negative direct-current supply conductor 69 through the variable resistor 173 of Fig. 2. A conductor 180 extends from the point 175b on the voltage divider 175 to the cathodes of the pentodes 161 and 162 and supplies a suitable biasing voltage for said pentodes, thus eliminating the battery 163 of Fig. 2.

The point 175c on the voltage divider 175 is selected to give a suitable potential, such, for example, as about 75 volts positive with respect to the negative supply conductor 69, and this point is connected to the junction point between the resistors 168 and 169, the same as in Fig. 2. The point 175d of the voltage divider is connected to the upper one of the deflecting plates 11f of the cathode ray tube 11, thus replacing the potentiometer 174 of the modification shown in Fig. 2. This point 175d is selected to give the desired negative potential with respect to the positive supply conductor 43, such, for example, as approximately 200 volts.

With the above-noted exceptions, the apparatus and circuit connections shown in Fig. 3 are the same as those shown in Fig. 2, and the operation of the system as thus modified is likewise essentially the same. The potentiometer 176 serves to regulate the grid bias of the triodes 57 and 58, and the potentiometer 177 provides a means of adjusting the grid bias on the pentodes 161 and 162. The connection of the deflecting plates 11f of the cathode ray tube in the manner described, renders the same responsive to changes in the difference of potential across the load resistor 165 in the plate circuit of the pentode amplifiers 161 and 162, the connection of the upper one of the plates 11f to the point 175d on the voltage divider being such as to give a suitable neutral position of the cathode ray beam in the oscillograph tube. The voltage drop across the resistor 165, plus the voltage drop across the portion of the voltage divider between the point 175d and the positive terminal, connected to the positive supply conductor 43, gives the total voltage applied to the plates 11f, which varies according to the amplitude of the signal under observation. The horizontal deflection of the cathode ray beam, therefore, is always governed by the amplitude of the signal which is being passed by one or the other of the amplifiers 161 and 162.

Fig. 4 shows a further modification of the amplifying and commutating circuits whereby three waves or signals may be observed simultaneously, instead of two, as in Figs. 1, 2, and 3. The modifications required to render the system suitable for the observation of three waves are slight and may be made without difficulty. The arrangement and operation are fundamentally the same, being merely extended to provide connections to three signal circuits and to provide means for subjecting the deflecting plates 11f of the oscillograph to the effects of the three signals in predetermined sequence and in rapid succession, as is done with two signal circuits in the systems previously disclosed herein.

In the system of Fig. 4 three amplifiers and three commutating tubes are provided and are respectively associated with the three signal circuits. At the end of each sweep of the cathode ray beam across the viewing screen a surge or impulse is transmitted by the sweep circuit to the commutating circuit, just as in the previously-described systems, and the commutating circuit then functions to switch the next signal circuit into operative connection with the oscillograph. This operation is repeated continuously in a predetermined cycle, so that the cathode ray beam of the oscillograph makes one trace across the viewing screen under the influence of the first signal, makes its next trace under the influence of the second signal, and makes its third trace under the influence of the third signal, whereupon the operation is repeated in continuous cycles, so that any given signal is traced on the screen on every third sweep of the beam.

The system of Fig. 4 comprises three pairs of signal circuit terminals, comprising a first pair 181 and 182, a second pair 183 and 184, and a third pair 185 and 186. Potentiometers 187, 188, and 189 are connected across the respective pairs of signal circuit terminals and the movable contacts of these potentiometers are respectively connected to the grids of three pentode amplifiers 190, 191, and 192. The signal for synchronizing the sweep circuit with the signal circuits is taken from the grid connection of the amplifier 192, through the conductor 54, in the same manner as in the systems hereinbefore described.

The filaments or heaters of the pentodes 190, 191, and 192 are connected in parallel across the filament-supply conductors 48 and 49, having the usual filament-bridging resistor 164 connected thereacross, with the mid-point tap of the latter connected to the cathodes of all of these amplifier tubes. The bias of these tubes is provided by a connection extending from said cathodes to a point 193a on a voltage divider 193, the terminals of which are respectively connected to the conductors 43 and 69 of the high-voltage, direct-current supply circuit.

The plates of the amplifiers 190, 191, and 192 are all connected together and through the conductor 53 to the lower one of the Y plates 11f of the cathode ray tube, as in Figs. 2 and 3. The plate voltage for the amplifiers is supplied by the supply conductor 43 through the load resistor 165, also as in Figs. 2 and 3.

The screen of the amplifier tube 190 is connected through a resistor 194 to the plate of a triode 195 and the screen of the amplifier 191 is connected through a variable resistor 196 to the plate of a triode 197. The screen of the amplifier 192 is connected through a variable resistor 198 and a normally-closed switch 199 to the plate of a triode 200.

The pentodes 190, 191, and 192 are similar to the pentodes 161 and 162 of Figs. 2 and 3, and the triodes 195, 197, and 200 of Fig. 4 are similar to the triodes 57 and 58 of Figs. 1, 2, and 3. The switch 199 in Fig. 4 is provided for the same purpose as the switches 59 and/or 60 in the previous figures.

The plate leads of the triodes 195, 197, and 200, which also constitute the screen supply leads for the amplifiers 190, 191, and 192, are designated by the reference characters 201, 202, and 203, respectively, and are respectively connected through resistors 204, 205, and 206 to a tap 193b on the voltage divider 193, whereby the screen voltages for the amplifiers 190, 191 and 192 are supplied. The conductors 201, 202, and 203 are also interconnected by circuits providing the desired cyclical operation of the commutating system. These interconnecting circuits comprise a connection between each pair of the three conductors 201, 202, and 203, and each of these connections includes a rectifier, a condenser and a resistor, all in series, and another resistor connected in parallel relation to the rectifier.

These elements comprise a rectifier 207, a resistor 208 connected in parallel relation thereto, a condenser 209 and a series resistor 210, connecting the conductors 201 and 202; a rectifier 211, a resistor 212 connected in parallel relation thereto, a condenser 213 and a series resistor 214, connecting the conductors 202 and 203; and a rectifier 215, a resistor 216 connected in parallel relation thereto, a condenser 217 and a series resistor 218, connecting the conductors 201 and 203. The rectifiers 207, 211, and 215 may suitably consist of copper oxide rectifiers which constitute one means of transferring the impulses from the plate circuit of one of the commutating triodes to the next one in the predetermined sequence of operation, without affecting the triode preceding it in said sequence. The resistors 208, 212, and 216 shunting the rectifiers 207, 211, and 215, respectively, are provided to effect charging of the condensers 209, 213, and 217 between the impulses, and the series resistors 210, 214, and 218 reduce the amplitude of the impulses from the plates of the respective triodes in order to prevent the extinguishing of both of the other triodes thereby.

The filaments or heaters of the triodes 195, 197, and 200 are all connected in parallel across the filament-supply circuit constituted by the conductors 71 and 72, the usual filament-bridging resistor 172 being also connected across said circuit, with a mid-point tap connected to the cathodes of the tubes 195, 197, and 200. These cathodes are connected through a common variable resistor 219, corresponding to the similarly connected variable resistors 70 of Fig. 1 and 173 of Fig. 2, to the negative supply conductor 69.

The air-core transformer 62, 64 is utilized in this system as in the other circuit arrangements hereinbefore disclosed, and one terminal of the secondary winding 64 of said transformer is connected to the grids of all of the triodes 195, 197, and 200. The other terminal of said secondary winding is connected to the negative conductor 69 of the high-voltage, direct-current supply circuit, as in Fig. 2.

A potentiometer 220 is connected in parallel relation to the portion of the voltage divider 193 between the point 193a and the negative supply conductor 69, and the movable contact of said potentiometer is connected to the ground conductor 24 in the same manner and for the same purpose as in the case of the potentiometer 177 in Fig. 3.

The upper one of the deflecting plates 11f in the system shown in Fig. 4 is connected to a movable potentiometer contact 193c on the voltage divider 193, which in this connection, therefore, constitutes a potentiometer also. This deflecting plate connection is similar to that illustrated in Fig. 3, except that it provides for adjustment of the total potential difference applied to the deflecting plates, in somewhat the same fashion as is provided by the use of the separate potentiometer 174 in Fig. 2.

The amplifying and commutating system shown in Fig. 4 is very similar in operation to that of Fig. 3. The only point which is believed to require explanation is that having to do with the manner in which the triodes 195, 197, and 200 are fired in predetermined sequence, as desired. To obtain a clear understanding of this point it may be assumed that at a given moment the triode 195 is non-conducting and that the triodes 197 and 200 are conducting. Under these conditions the amplifier 190 will be passing the signal of the associated signal circuit, connected to the terminals 181 and 182, to the oscillograph observation circuit, while the amplifiers 191 and 192 will be blocking the signals of the signal circuits respectively associated therewith.

Now, at the end of the sweep of the electron beam in the cathode ray tube, as determined by the operation of the sweep circuit, a surge is transmitted from the sweep circuit through the air-core transformer 62, 64 to the grids of the triodes 195, 197, and 200, and this surge affects the triode 195 to render the same conducting. The resulting sudden fall of potential of the plate of the triode 195 lowers the potential of the plate of triode 197 momentarily below the discharge sustaining voltage, rendering said triode 197 non-conducting. However, the triode 200 is not affected at this time because the rectifier 215 prevents its plate voltage from being lowered as a result of the above-mentioned sudden drop of the plate voltage of the triode 195.

Therefore, during the next cycle of the sweep circuit the triode 197 will be non-conducting and the amplifier 191 will accordingly be conditioned to pass the signal of the signal circuit connected to the terminals 183 and 184 to the observation circuit, whereas the signals of the circuits connected to the terminals 181, 182, and 185, 186 will be blocked by the amplifiers 190 and 192, respectively. At the end of that cycle the surge from the sweep circuit to the commutating circuit will restore the triode 197 to conducting condition and render the triode 200 non-conducting, so that on the next ensuing cycle of the sweep circuit the third signal will be passed by the amplifier 192, while the first and second signals will be blocked by the amplifiers 190 and 191, respectively.

It will be apparent that this operation will go on in a continuous cycle as long as the system is energized, so that the signals of the three signal circuits will be observed in the oscillograph in predetermined sequence during each complete cycle, consisting of three cycles of the sweep circuit. The oscillograph observation circuit, therefore, is subjected to the effects of the three signal circuits in rapid succession and predetermined sequence, so that the three signals will be observed simultaneously on the viewing screen of the oscillograph.

It is immaterial, of course, whether the sequence proceeds in one direction or the other, and it will be understood that the rectifiers 207, 211 and 215 or other suitable means for establishing the sequence may be arranged to provide either direction of progression, or random selection between the two possible directions, so long as the sequence remains constant throughout each continuous period of operation, after once being established for that operation. In any event, the sequence is predetermined as soon as the first signal which happens to be observed is followed by the second, and that is the only limitation contemplated herein with reference to the sequential operation.

From all of the foregoing description it will be seen that the present invention provides means for controlling the operation of a cathode ray oscillograph of any ordinary type having a single electron beam established therein, in such manner that the beam is caused to trace the signals of two or more signal circuits in rapid succession to permit simultaneous observation of all of said signals on the viewing screen of the oscillograph. It is obvious, of course, that the system may be extended to accommodate the observation of any number of signals. The objectionable effect of flicker, which may become noticeable when the number of signals to be observed is considerably increased, may be retarded by utilizing, for the fluorescent coating on the oscillograph viewing screen, a highly retentive material, whereby the traces produced thereon by the electron beam remain visible for longer periods of time. It will also be understood that the systems herein disclosed are not limited to the operation of oscillographs of the type in which only visual observation is provided, but that they are equally adaptable to oscillographs having provision for photographic recording of the signals traced by the electron beam.

It should be clearly understood that the invention is not limited to the details of design or arrangement of parts herein disclosed, such disclosure being merely for the purpose of conveying a clearer understanding of suitable embodiments of the invention. It will be apparent to those skilled in the art that various changes and modifications other than those herein disclosed may be made without departing from the spirit and scope of the invention, and, in particular, that wherever numerical values of voltages and other quantities have been given herein, the same are merely given by way of example and not as limitations in any sense.

What is claimed as new and is desired to secure by Letters Patent, therefore, is:

1. A cathode ray oscillograph system comprising connections to a plurality of signal circuits, an oscillograph observation circuit, and electronic means operative automatically to subject said observation circuit to the effects of the signals of the different signal circuits in rapid succession, whereby a simultaneous observation of said signals is afforded.

2. A cathode ray oscillograph system comprising connections to a plurality of signal circuits, an oscillograph observation circuit, and electronic means operative automatically to subject said observation circuit to the effects of the signals of the different signal circuits in rapid succession and in predetermined sequence, whereby a simultaneous observation of said signals is afforded.

3. A cathode ray oscillograph system comprising connections to a plurality of signal circuits, an oscillograph observation circuit, and electronic means operative automatically to subject said observation circuit to the effects of the signals of the different signal circuits in rapid succession, whereby a simultaneous observation of said signals is afforded, the switching from any one signal circuit to the next taking place at the end of a predetermined period of observation of the signal of said one circuit.

4. A cathode ray oscillograph system comprising connections to a plurality of signal circuits, an oscillograph observation circuit, and electronic means operative automatically to subject said observation circuit to the effects of the signals of the different signal circuits in rapid succession, whereby a simultaneous observation of said signals is afforded, the switching between different signal circuits taking place at the end of each complete trace of any one signal.

5. A cathode ray oscillograph system comprising connections to a plurality of signal circuits, an electronic amplifier associated with each of said signal circuit connections, an oscillograph observation circuit connected with said amplifiers, and means for controlling said amplifiers in predetermined sequence to cause the same to subject said observation circuit to the effects of said signal circuits individually in corresponding sequence.

6. A cathode ray oscillograph system comprising connections to a plurality of signal circuits, an electronic amplifier associated with each of said signal circuit connections, an oscillograph observation circuit connected with said amplifiers, and means for controlling the grid bias voltages of said amplifiers in predetermined sequence to cause the latter to subject said observation circuit to the effects of said signal circuits individually in corresponding sequence.

7. A cathode ray oscillograph system comprising connections to a plurality of signal circuits, a two-stage triode amplifier associated with each of said signal circuit connections, an oscillograph observation circuit connected with said amplifiers, and means for controlling said amplifiers in predetermined sequence to cause the same to subject said observation circuit to the effects of said signal circuits individually in corresponding sequence.

8. A cathode ray oscillograph system comprising connections to a plurality of signal circuits, a two-stage triode amplifier associated with each of said signal circuit connections, an oscillograph observation circuit connected with said amplifiers, and means for controlling the grid bias voltages of the second stages of said amplifiers in predetermined sequence to cause the latter to subject said observation circuit to the effects of said signal circuits individually in corresponding sequence.

9. A cathode ray oscillograph system comprising connections to a plurality of signal circuits, a multi-grid electronic amplifier associated with each of said signal circuit connections, an oscillograph observation circuit connected with said amplifiers, and means for controlling said amplifiers in predetermined sequence to cause the same to subject said observation circuit to the effects of said signal circuits individually in corresponding sequence.

10. A cathode ray oscillograph system comprising connections to a plurality of signal circuits, a single-stage pentode amplifier associated with each of said signal circuit connections, an oscillograph observation circuit connected with said amplifiers, and means for controlling said amplifiers in predetermined sequence to cause the same to subject said observation circuit to the effects of said signal circuits individually in corresponding sequence.

11. A cathode ray oscillograph system comprising connections to a plurality of signal circuits, a pentode amplifier associated with each of said signal circuit connections, an oscillograph observation circuit connected with said amplifiers, and means for controlling certain of the auxiliary grid voltages of said amplifiers in predetermined sequence to cause the latter to subject said observation circuit to the effects of said signal circuits individually in corresponding sequence.

12. A cathode ray oscillograph system comprising connections to a plurality of signal circuits, an electronic amplifier associated with each of said signal circuit connections, an oscillograph observation circuit connected with said amplifiers, and an electronic commutating circuit for controlling said amplifiers in predetermined sequence to cause the same to subject said observation circuit to the effects of said signal circuits individually in corresponding sequence.

13. A cathode ray oscillograph system comprising connections to a plurality of signal circuits, an electronic amplifier associated with each of said signal circuit connections, an oscillograph observation circuit connected with said amplifiers, and an electronic commutating circuit for controlling said amplifiers in predetermined sequence to cause the same to subject said observation circuit to the effects of said signal circuits individually in corresponding sequence, said electronic commutating circuit comprising a grid-controlled rectifier associated with each of said amplifiers and an inverter circuit control associated therewith.

14. A cathode ray oscillograph system comprising connections to a plurality of signal circuits, an electronic amplifier associated with each of said signal circuit connections, an oscillograph observation circuit connected with said amplifiers, and an electronic commutating circuit for controlling said amplifiers in predetermined sequence to cause the same to subject said observation circuit to the effects of said signal circuits individually in corresponding sequence, said electronic commutating circuit comprising a grid-controlled rectifier associated with each of said amplifiers and an inverter circuit control associated therewith, and said inverter circuit control including unidirectional circuit-controlling devices insuring the predetermined sequential operation of the commutating circuit.

15. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, and an electronic sweep circuit for controlling said time-axis circuit.

16. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, an electronic sweep circuit for controlling said time-axis circuit, and a connection from said sweep circuit to said commutating circuit to effect timing of the operation of the latter.

17. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, and an electronic sweep circuit for controlling said time-axis circuit, said sweep circuit comprising a condenser and charging means therefor to give the desired timing action.

18. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, and an electronic sweep circuit for controlling said time-axis circuit, said sweep circuit comprising a condenser, charging means therefor to give the desired timing action, and means operating suddenly to discharge said condenser when the voltage of the charge thereof reaches a predetermined value.

19. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, and an electronic sweep circuit for controlling said time-axis circuit, said sweep circuit comprising a condenser, charging means therefor to give the desired timing action, and a grid-controlled rectifier having its cathode connected to said condenser and providing a discharge path for said condenser whereby the same is discharged suddenly when the voltage of its charge reaches a predetermined value.

20. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, and an electronic sweep circuit for controlling said time-axis circuit, said sweep circuit comprising a condenser and a charging circuit therefor including a pentode of high A. C. plate resistance connected in series with said condenser and serving as a constant-current device to give the desired timing action through the charging of said condenser.

21. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, an electronic sweep circuit for controlling said time-axis circuit, and a connection between one of said signal circuit connections and said sweep circuit to synchronize the action of the latter with said signal circuit.

22. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause same to subject said observation circuit to the effects of said signal circuits individually in corresponding sequence, an oscillograph time-axis circuit, an electronic sweep circuit for controlling said time-axis circuit, and a connection between one of said signal circuit connections and said sweep circuit to synchronize the action of the latter with said signal circuit, said connection comprising an electronic coupling device preventing transients set up in the sweep circuit from affecting the signal circuit.

23. A cathode ray oscillograph system comprising connections to a plurality of signal circuits, an electronic amplifier associated with each of said signal circuit connections, an oscillograph observation circuit connected with said amplifiers, an electronic commutating circuit for controlling said amplifiers in predetermined sequence to cause the same to subject said observation circuit to the effects of said signal circuits individually in corresponding sequence, an oscillograph time-axis circuit, an electronic sweep circuit for controlling said time-axis circuit, a connection from said sweep circuit to said commutating circuit to effect timing of the operation of the latter, and a connection between one of said signal circuit connections and said sweep circuit to synchronize the action of the latter with said signal circuit.

24. An electrical circuit system of the character described, comprising a gaseous rectifier, an alternating current supply circuit therefor, an output circuit having a relatively light load connected thereto, and a resistance connected in series with said supply circuit to insure continuous operation of the rectifier.

25. An electrical circuit system of the character described, comprising a gaseous rectifier, an alternating current supply circuit therefor, an output circuit having a relatively light load connected thereto, and a variable resistance connected in series with said supply circuit to insure continuous operation of the rectifier and to provide a variable output voltage control therefor.

26. The method of controlling a cathode ray oscillograph to cause the same to furnish simultaneous observation of a plurality of signals, which comprises applying a timing influence to the oscillograph to provide a continuously repeating time axis for the observation, and also utilizing said timing influence to subject the oscillograph sequentially to the influence of the different signals in rapid succession.

27. The method of controlling a cathode ray oscillograph to cause the same to furnish simultaneous observation of a plurality of signals, which comprises applying a timing influence to the oscillograph to provide a continuously repeating time axis for the observation, and also utilizing said timing influence to subject the oscillograph sequentially to the influence of the different signals in such manner as to provide individual traces of different signals on each two successive repetitions of the time axis.

28. The method of visually observing a plurality of signalling indications which comprises developing an electronic ray, deflecting the ray across an observation plane under the influence of timing control signals to provide a continuously repeating time axis of observation in one plane, deflecting the ray in a mutually perpendicular direction under the influence of the signalling indications to be observed, cyclically switching the last named deflection from one to another of the signalling indications in sequence, and interlocking the switching and timing of the deflection paths to provide representations of different signalling indications on successive ray traversals along the timing axis path.

29. The method of controlling a cathode ray oscillograph to cause the same to furnish simultaneous observation of a plurality of signals which comprises applying a timing influence to the oscillograph to provide a continuously repeating time axis for observation and also utilizing said timing influence to subject the oscillograph sequentially to the influence of the different signals in such manner as to provide individual traces of each of the different signals of the plurality on each successive repetition of the time axis and then to repeat the representations in the same sequence during the presence of the plurality of signals.

30. A system for visually observing a plurality of signalling indications which comprises means for developing an electronic ray, means for deflecting the ray across an observation plane under the influence of timing control signals to provide a continuously repeating time axis of observation in one plane, means for deflecting the ray in a mutually perpendicular direction under the influence of the signalling indications to be observed, means for switching the last-named deflection from one to another of the signalling indications in a predetermined order, and means for interlocking in a predetermined ratio the switching and timing of the deflection paths to provide representations of different signalling indications for ray traversals along the timing axis path.

CARL S. ROYS.
HARRY F. MAYER.